United States Patent [19]

Osanai

[11] Patent Number: 4,463,395
[45] Date of Patent: Jul. 31, 1984

[54] SUPPORT MECHANISM FOR A HEAD LEVER OF A CASSETTE TAPE RECORDER

[75] Inventor: Akira Osanai, Tokyo, Japan

[73] Assignee: Olympus Optical Co., Ltd., Tokyo, Japan

[21] Appl. No.: 303,920

[22] Filed: Sep. 21, 1981

[30] Foreign Application Priority Data

Sep. 25, 1980 [JP] Japan .................................. 55-133163

[51] Int. Cl.³ .......................... G11B 5/54; G11B 21/02
[52] U.S. Cl. ............................................. 360/105
[58] Field of Search ........ 360/105, 106, 107, 102–104, 360/109, 86, 97–99, 90

[56] References Cited

U.S. PATENT DOCUMENTS

| | | | |
|---|---|---|---|
| 2,970,841 | 2/1961 | Lorenz | 360/105 |
| 3,918,089 | 11/1975 | Kato et al. | 360/105 X |
| 3,969,768 | 7/1976 | Ebbing | 360/106 X |
| 4,071,866 | 1/1978 | Butsch | 360/106 |
| 4,351,009 | 9/1982 | Osada et al. | 360/105 |

Primary Examiner—John H. Wolff
Attorney, Agent, or Firm—Frishauf, Holtz, Goodman & Woodward

[57] ABSTRACT

A support mechanism for a tape recorder head lever includes first and second guide bars respectively facing each end of the head lever, and positioned between the head lever and base board to slidably support the head lever. The first guide bar is fixed to either one of a strip part extending from one end of the head lever in the direction in which the head lever slides, or the base board. The second guide bar is supported for movement by a forked portion formed on either one of the other end of the head lever or the base board, thus allowing the head lever to have a certain latitude of sidewise movement as the head lever slides on the guide bars.

5 Claims, 6 Drawing Figures

SUPPORT MECHANISM FOR A HEAD LEVER OF A CASSETTE TAPE RECORDER

BACKGROUND OF THE INVENTION

This invention relates to a cassette tape recorder, and more particularly to a support mechanism for a head lever of a cassette tape recorder wherein the head lever is slidably supported on a base board.

With a cassette tape recorder wherein a head lever is slidably mounted on a base board, the head lever should slide back and forth in parallel with the base board. To assure the slide of the head lever in parallel with the base board, the head lever support mechanism is provided with at least two support means. The head lever support means is generally formed of a combination of a guide hole and a guide pin sliding through the guide hole. The support means arranged as described above can indeed rigidly hold the head lever. Where, however, the head lever is pushed in a direction which does not fully coincide with that in which the head lever is normally required to slide, then the guide pin tends to scratch the inner wall of the guide hole. Eventually, the peripheral surface of the guide pin and the inner wall of the guide hole are worn out, resulting in an increase in the gap between the surface and inner wall, gradually presenting difficulties in the sliding of the head lever in parallel with the surface of the base board.

SUMMARY OF THE INVENTION

It is accordingly the object of this invention to provide a support mechanism for a head lever of a tape recorder free of the aforementioned drawbacks accompanying the prior art. To attain the above-described object, this invention provides a support mechanism for a head lever of a tape recorder, wherein a head lever is slidably mounted on a base board by first and second guide bars facing both ends of the head lever between the base board and the head lever. The first guide bar is fixed to either a member extending from one end of the head lever in the direction in which the head lever slides, or the base board, and is slidably supported by the other of said two members. The second guide bar is fixed to either the base board or head lever and is supported by a forked portion formed on the other of said two members, thereby allowing the head lever to have a certain latitude of sidewise movement.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
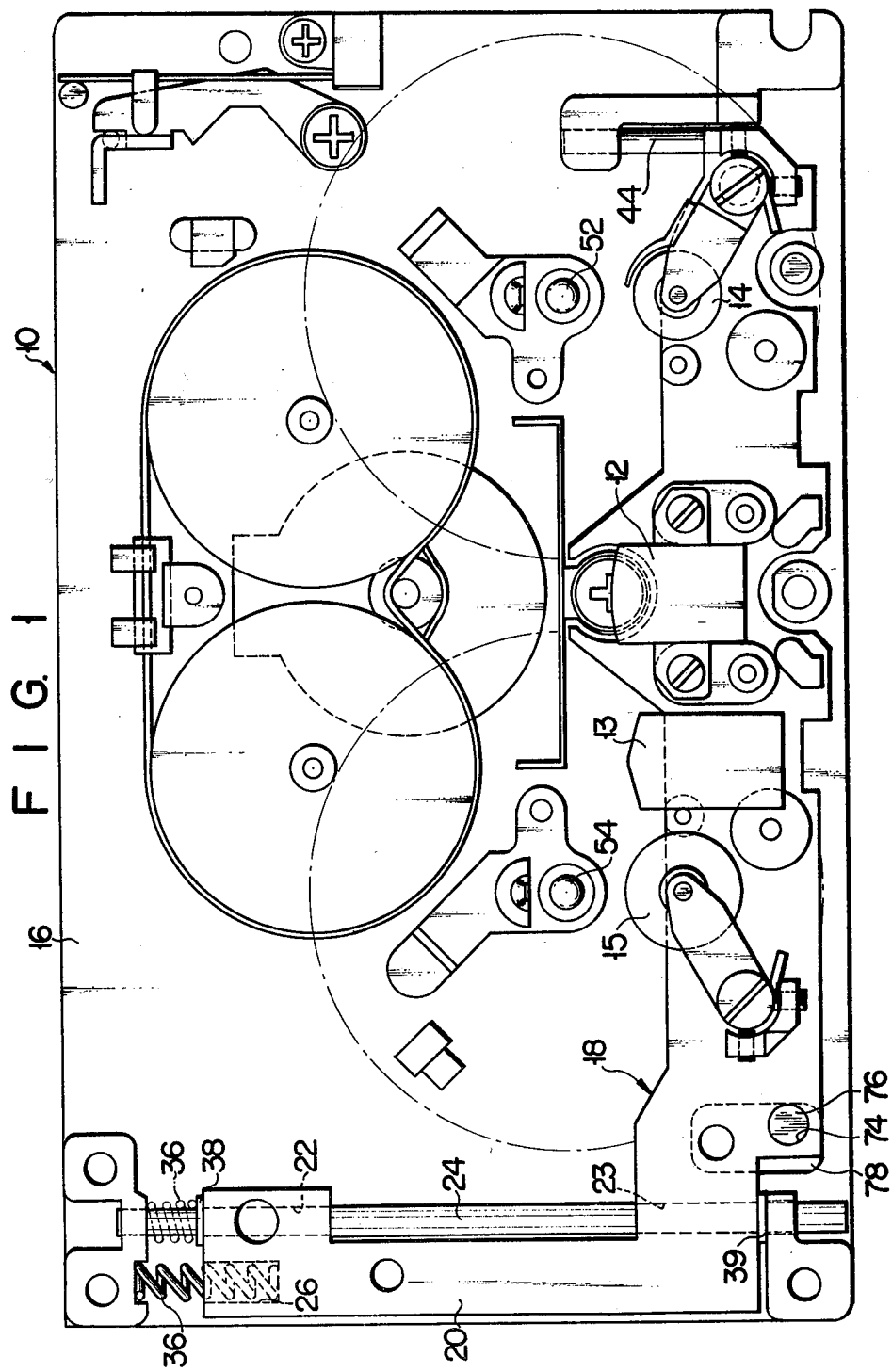
FIG. 1 is a schematic top plan view of a cassette tape recorder provided with a support mechanism embodying the present invention for a head lever.

There will now be described, by reference to the accompanying drawing, a support mechanism embodying the present invention for a head lever. In this embodiment, a tape recorder is concretely described as a cassette tape recorder. Obviously, the present head lever support mechanism need not be limited to the type usable with the cassette tape recorder. As shown in FIG. 1, the cassette tape recorder 10 comprises a head lever 18 slidably mounted on the base board 16 in support of magnetic heads 12, 13 and pinch rollers 14, 15.

Figure 2:
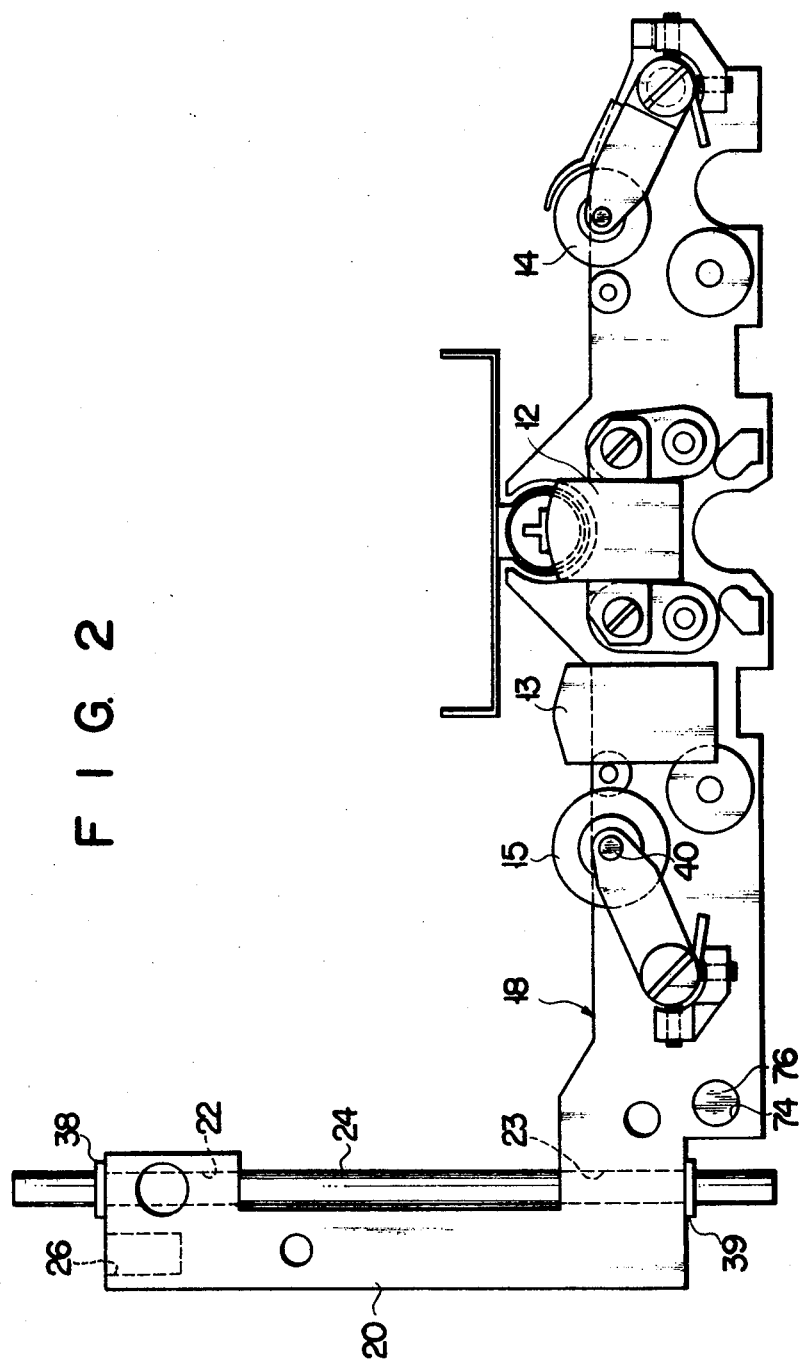
FIG. 2 is a top plan view of the head lever.
Figure 3:
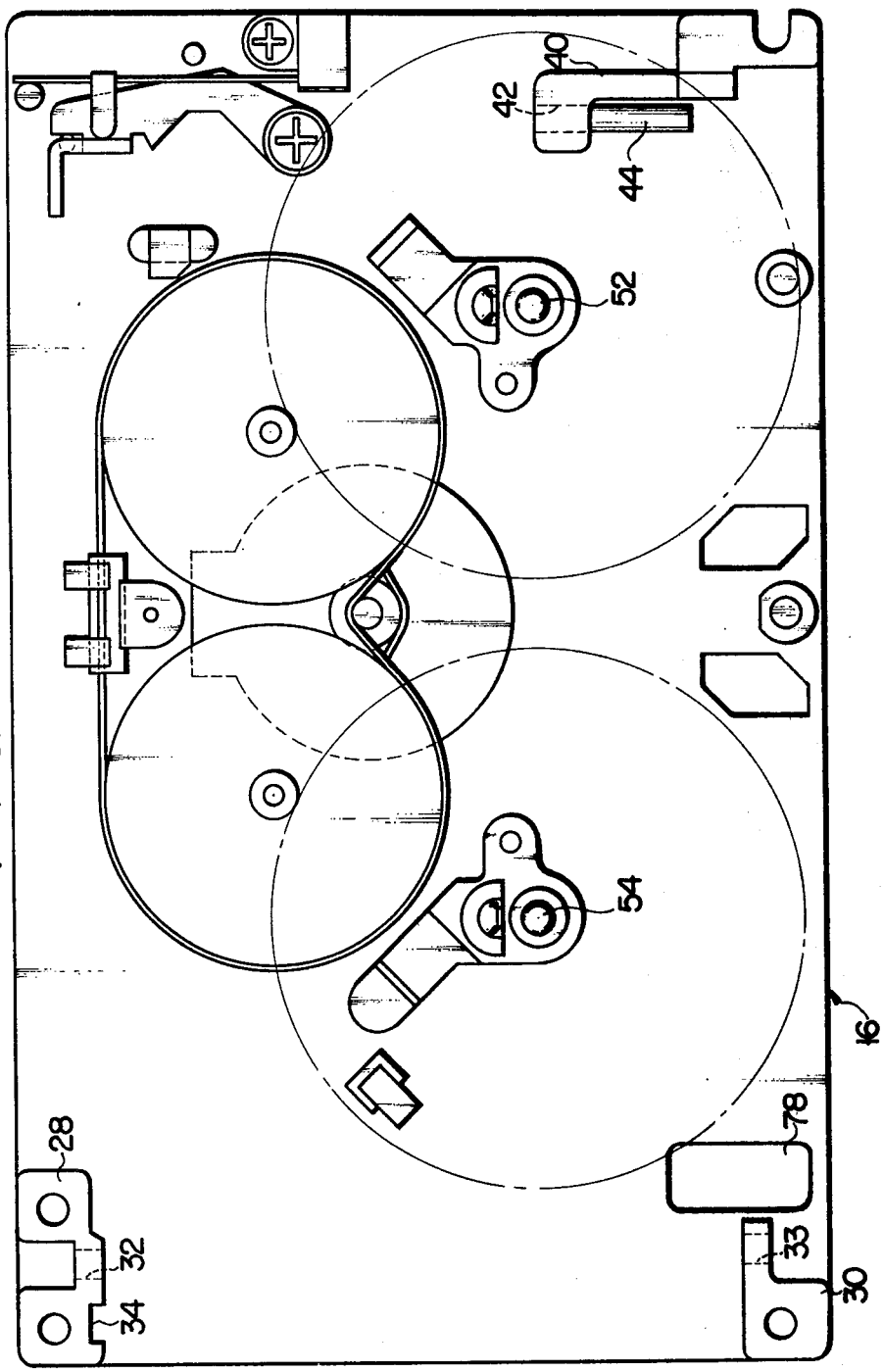
FIG. 3 is a top plan view of the base board.
Figure 4:
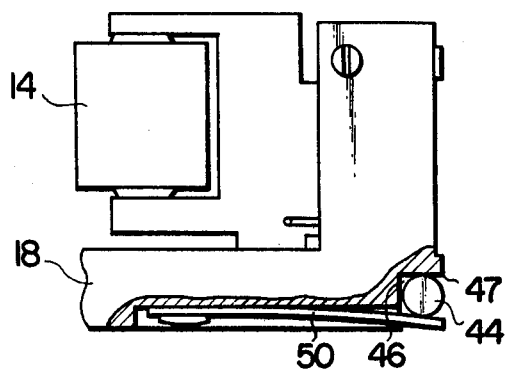
FIG. 4 is a fractional top plan view of the head lever.
Figure 5:
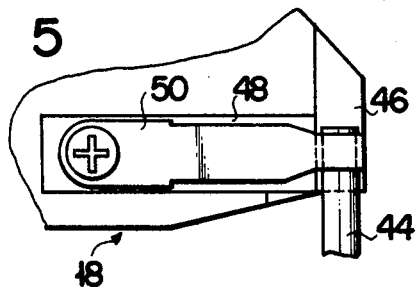
FIG. 5 is a fractional bottom plan view of the head lever.

As shown in FIGS. 1 and 2, especially FIG. 2, the head lever 18 is provided at one end with an integral strip 20 extending first laterally of the head lever 18 and then at right angles thereto. A guide bar 24 is forcefully inserted into a hole 22 formed in the extending integral strip 20 and a hole 23 formed in the head lever 18 itself. The guide bar 24 is set at right angles to the head lever 18. A spring-receiving blind hole 26 is formed at a free end of the extending strip 20. As schematically indicated in FIG. 3, two upright walls 28, 30 are respectively built on both left sides of the base board 16. Guide holes 32, 33 are respectively formed in the upright walls 28, 30. A depression 34 is formed in the upright wall 28. A return spring 36 (FIG. 1) such as a compression coil spring is provided between the depression 34 and the spring-receiving blind hole 26 of the head lever 18. This return spring 36 may be wound about the guide bar 24 instead of being set between the depression 34 and spring-receiving blind hole 26. As indicated in FIG. 1, both ends of the guide bar 24 are respectively loosely inserted into the guide holes 32, 33, thereby enabling the guide bar 24 to slide along the surface of the base board 16. Reference numerals 38, 39 represent shock-absorbing plastics rings intended to suppress collision between the head lever 18 and upright walls 28, 30 and also to define the position of the head lever. An upright wall 40 (FIG. 3) is formed at the right rear corner of the base board 16. Another guide bar 44 (FIG. 3) is forcefully inserted into a hole 42 formed in the upright wall 40. As shown in FIGS. 4 and 5, the guide bar 44 extends through a cavity 46 formed at the right end of the bottom wall of the head lever 18. As better seen from FIG. 5, a free end of a plate spring 50 held in a depression 48 formed in the bottom wall of the head lever 18 is pressed against the guide bar 44 to urge it toward the upper wall of the cavity 46. In other words, the other end portion of the head lever 18 is constructed in a forked form, one of whose arms is constituted by the plate spring 50. The guide bar 44 is held in the cavity 46 formed in the fork-shaped end portion of the head lever 18. Therefore, the head lever 18 is restricted in vertical movement relative to the guide bar 44, but can be freely moved in a horizontal direction. Namely, the head lever 18 has a certain latitude of sidewise movement.

As previously described, the head lever 18 is enabled to slide along the surface of the base board 16 by means of a pair of guide bars 24, 44. In this case, the head lever 18 is rigidly restricted in the vertical and horizontal movements relative to the guide bar 24, but is restricted only in the vertical movement relative to the guide bar 44 while being free to be horizontally moved, namely, the head lever has a certain latitude of sidewise movement. Accordingly, the head lever 18 can smoothly slide along the surface of the base board 16 against the urging force of the return spring 36 without scratching the guide bars 24, 42, to a position (FIG. 2) for the play or record mode in which the tape is clamped between the heads 12, 13 and capstan shafts 52, 54. With the above-mentioned arrangement, it is unnecessary to try to assure an exact parallelism between the guide bars 24, 44. Therefore, the head lever 18 can slide properly by way of a simple and inexpensive arrangement.

In the foregoing embodiment, the guide bar 24 is fixed to the head lever 18, and the guide bar 44 is fixed to the base board 16. However, the present invention is not limited to such arrangement, but obviously both guide bars 24, 44 may be fixed to the head lever 18. In such case, the base board 16 should preferably be provided with a fork-shaped support section in order to hold the guide bar 44. Further, the guide bars 24, 44 may be fixed to the base board 16. Also, the plate spring 50 was made to constitute a lower arm of the fork-shaped lower end portion. However, this arrangement need not be exclusively followed, but the plate spring 50 may constitute an upper arm of the fork-shaped end portion.

Figure 6:
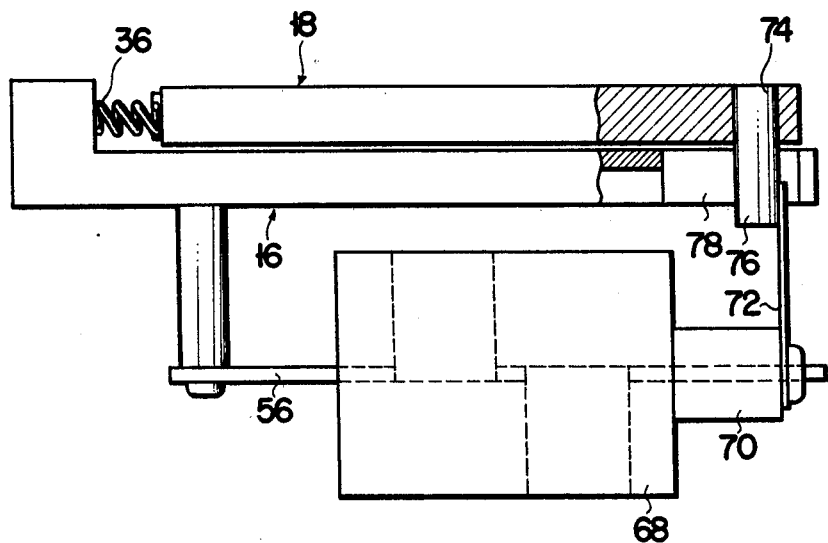
FIG. 6 is a left side view of a cassette tape recorder indicated in FIG. 1.

Fixed to a fitting board 56 is a plunger mechanism 68 (FIG. 6), which comprises a plunger slidable inwardly in response to an energized solenoid, and to the end of which a connection board 72 is bolted. The movement of the head lever 18 is controlled by the plunger mechanism 68. The head lever 18 is provided with a downward extending actuating rod 76 forcefully inserted into a hole 74. An elongate guide hole 78 for the actuating rod 76 is formed in the base board 16. The inner end of the connection board 72 is pressed against the peripheral surface of the actuating rod 76 on the outside thereof. When the solenoid of the plunger mechanism 68 is energized to push the plunger 70 inward, then the actuating rod 76 is pushed by the connection board 72 and is moved inward jointly with the plunger 70. The head lever 18 is shifted inward against the urging force of the return spring 36. As a result, the heads 12, 13 mounted on the head lever 18 are pressed against a tape (not shown) clamped between the capstan shafts 52, 54 for the play or record mode.

As described above, the head lever support mechanism of the present invention causes a head lever to be slidably mounted on a base board by the use of first and second guide bars respectively facing each end of the head lever between the base board and the head lever. The first guide bar is fixed to either one of a strip extending from one end of the head lever in the direction in which the head lever slides, or a base board, and is slidably supported by the other one of those two parts. The second guide bar is fixed to either one of the base board or the head lever, and is supported by a forked portion formed on the other one of those two parts, thereby allowing the head lever to have a certain latitude in sidewise movement. With the head lever support mechanism constructed as described above, the head lever is rigidly supported by the first guide bar, but is loosely supported by the second guide bar to have a certain latitude in the sidewise movement. Since the head lever has a latitude in the sidewise movement, no jarring arises between the head lever and guide bars, thereby assuring the smooth movement of the head lever accurately in parallel with the base board. A head lever support mechanism constructed as described above need not be machined with high precision, but can be manufactured at low cost. If one of the two arms constituting the forked portion formed on either the base board or the head lever is made of a plate spring, it is possible to assure the smooth and accurate movement of the head lever and the easy machining of the head lever and support mechanism.

What is claimed is:

1. A head lever supporting mechanism for a tape recorder, which has a base board and a head lever slidable relative to the base board in a predetermined sliding direction, comprising:
   a first guide bar extending in the sliding direction of the head lever for supporting one of two opposite ends of the head lever for sliding movement in the axial direction of the first guide bar;
   support means for supporting the first guide bar above the base board;
   a second guide bar fixed to a selected one of the other end of the head lever and the base board, said second guide bar extending substantially parallel to the first guide bar;
   a forked portion formed on that one of the other end of the head lever and the base board to which the second guide bar is not fixed, said forked portion engaging the second guide bar for movement relative to the second guide bar in the axial direction of the first guide bar and in a direction perpendicular to the first guide bar and transversely of the first and the second guide bars in a plane extending between the first and second guide bars;
   said forked portion comprising a contacting face touching the circumference of the second guide bar, and a plate spring for resiliently urging the second guide bar on its circumference against the contacting face of the forked portion, such that the second guide bar is resiliently sandwiched between the contacting face and the plate spring.

2. A head lever supporting mechanism according to claim 1, wherein said first and said second guide bars extend parallel to the base board and are positioned above and substantially equidistant from the base board, so that the head lever is supported to slide parallel to the base board.

3. A head lever supporting mechanism according to claim 2, wherein said forked portion is formed on said other end of the head lever, the second guide bar is fixed to the base board, the contacting face is formed parallel to the base board and positioned on the second guide bar, and the plate spring is positioned between the second guide bar and the base board.

4. A head lever supporting mechanism according to claim 1, wherein said first guide bar is fixed to one end of the head lever, and the support means is fixed to the base board and has a hole for receiving the first guide bar to allow the first guide bar to slide in the axial direction of the first guide bar.

5. A head lever supporting mechanism according to claim 2, whereby said forked portion is formed on said other end of said head lever, the second guide bar is fixed to the base board, and wherein said forked portion is arranged to extend substantially perpendicularly to the second guide bar so that one of said contacting face and plate spring contacts an upper circumferential portion of the guide bar, and the other of said contacting face and plate spring contacts a lower circumferential portion of the second guide bar.

* * * * *